US011157777B2

(12) United States Patent
Farre Guiu et al.

(10) Patent No.: US 11,157,777 B2
(45) Date of Patent: Oct. 26, 2021

(54) QUALITY CONTROL SYSTEMS AND METHODS FOR ANNOTATED CONTENT

(71) Applicant: Disney Enterprises, Inc., Burbank, CA (US)

(72) Inventors: Miquel Angel Farre Guiu, Bern (CH); Matthew C. Petrillo, Sandy Hook, CT (US); Marc Junyent Martin, Barcelona (ES); Anthony M. Accardo, Los Angeles, CA (US); Avner Swerdlow, Los Angeles, CA (US); Monica Alfaro Vendrell, Barcelona (ES)

(73) Assignee: Disney Enterprises, Inc., Burbank, CA (US)

( * ) Notice: Subject to any disclaimer, the term of this patent is extended or adjusted under 35 U.S.C. 154(b) by 196 days.

(21) Appl. No.: 16/512,223

(22) Filed: Jul. 15, 2019

(65) Prior Publication Data
US 2021/0019576 A1 Jan. 21, 2021

(51) Int. Cl.
*G06K 9/62* (2006.01)
*G06K 9/00* (2006.01)

(52) U.S. Cl.
CPC ....... *G06K 9/6267* (2013.01); *G06K 9/00369* (2013.01); *G06K 9/00744* (2013.01); *G06K 9/6262* (2013.01)

(58) Field of Classification Search
None
See application file for complete search history.

(56) References Cited

U.S. PATENT DOCUMENTS

| 7,375,731 | B2 |   | 5/2008  | Divakaran |            |
|-----------|----|---|---------|-----------|------------|
| 7,606,425 | B2 |   | 10/2009 | Bazakos   |            |
| 7,849,048 | B2 | * | 12/2010 | Langseth  | G06F 16/254 |
|           |    |   |         |           | 707/602    |
| 8,208,694 | B2 |   | 6/2012  | Jelonek   |            |
| 8,626,682 | B2 |   | 1/2014  | Malik     |            |
| 8,737,817 | B1 |   | 5/2014  | Izo       |            |
| 8,769,556 | B2 |   | 7/2014  | Guo       |            |
| 8,990,128 | B2 |   | 3/2015  | He        |            |

(Continued)

OTHER PUBLICATIONS

Justin Talbot et al. "Ensemble Matrix: Interactive Visualization to Support Machine Learning with multiple classifiers" CHI 2009, Apr. 4-9, 2009, Boston, MA, USA.

*Primary Examiner* — Santiago Garcia
(74) *Attorney, Agent, or Firm* — Farjami & Farjami LLP

(57) ABSTRACT

According to one implementation, a quality control (QC) system for annotated content includes a computing platform having a hardware processor and a system memory storing an annotation culling software code. The hardware processor executes the annotation culling software code to receive multiple content sets annotated by an automated content classification engine, and obtain evaluations of the annotations applied by the automated content classification engine to the content sets. The hardware processor further executes the annotation culling software code to identify a sample size of the content sets for automated QC analysis of the annotations applied by the automated content classification engine, and cull the annotations applied by the automated content classification engine based on the evaluations when the number of annotated content sets equals the identified sample size.

20 Claims, 6 Drawing Sheets

(56) References Cited

U.S. PATENT DOCUMENTS

| | | |
|---|---|---|
| 8,996,452 B2 | 3/2015 | Danciu |
| 9,015,730 B1 * | 4/2015 | Allen ................ G06F 9/541 |
| | | 719/313 |
| 9,807,472 B1 | 10/2017 | Cox |
| 10,057,644 B1 | 8/2018 | Guiu |
| 2002/0184098 A1 | 12/2002 | Giraud |
| 2002/0186867 A1 | 12/2002 | Gutta |
| 2005/0080671 A1 | 4/2005 | Giraud |
| 2006/0053342 A1 | 3/2006 | Bazakos |
| 2008/0002892 A1 | 1/2008 | Jelonek |
| 2008/0312906 A1 | 12/2008 | Balchandran |
| 2009/0116695 A1 | 5/2009 | Anchyshkin |
| 2009/0133051 A1 | 5/2009 | Hildreth |
| 2009/0196464 A1 | 8/2009 | Dimitrova |
| 2009/0210902 A1 | 8/2009 | Slaney |
| 2009/0217315 A1 | 8/2009 | Malik |
| 2009/0285454 A1 | 11/2009 | Xu |
| 2010/0007726 A1 | 1/2010 | Barbieri |
| 2010/0008547 A1 | 1/2010 | Yagnik |
| 2010/0067745 A1 | 3/2010 | Kovtun, IV |
| 2010/0141787 A1 | 6/2010 | Bibioi |
| 2010/0299210 A1 | 11/2010 | Giraud |
| 2011/0052012 A1 | 3/2011 | Bambha |
| 2011/0129126 A1 | 6/2011 | Begeja |
| 2011/0150295 A1 | 6/2011 | Eckhoff |
| 2011/0150296 A1 | 6/2011 | Eckhoff |
| 2011/0150297 A1 | 6/2011 | Eckhoff |
| 2011/0150298 A1 | 6/2011 | Eckhoff |
| 2011/0150299 A1 | 6/2011 | Eckhoff |
| 2011/0231787 A1 | 9/2011 | Haddick |
| 2012/0072936 A1 | 3/2012 | Small |
| 2012/0215727 A1 | 8/2012 | Malik |
| 2012/0278275 A1 | 11/2012 | Danciu |
| 2013/0036011 A1 | 2/2013 | Roberts |
| 2013/0325756 A1 | 12/2013 | He |
| 2014/0368688 A1 * | 12/2014 | John Archibald .... G06F 1/3215 |
| | | 348/222.1 |
| 2017/0300533 A1 * | 10/2017 | Zhang ................ G06N 20/10 |
| 2017/0323212 A1 | 11/2017 | Volkov |
| 2019/0034822 A1 | 1/2019 | Guiu |
| 2020/0005401 A1 * | 1/2020 | Bull ................ G06Q 10/06393 |
| 2020/0326837 A1 * | 10/2020 | Ni ................ G06F 3/04847 |

* cited by examiner

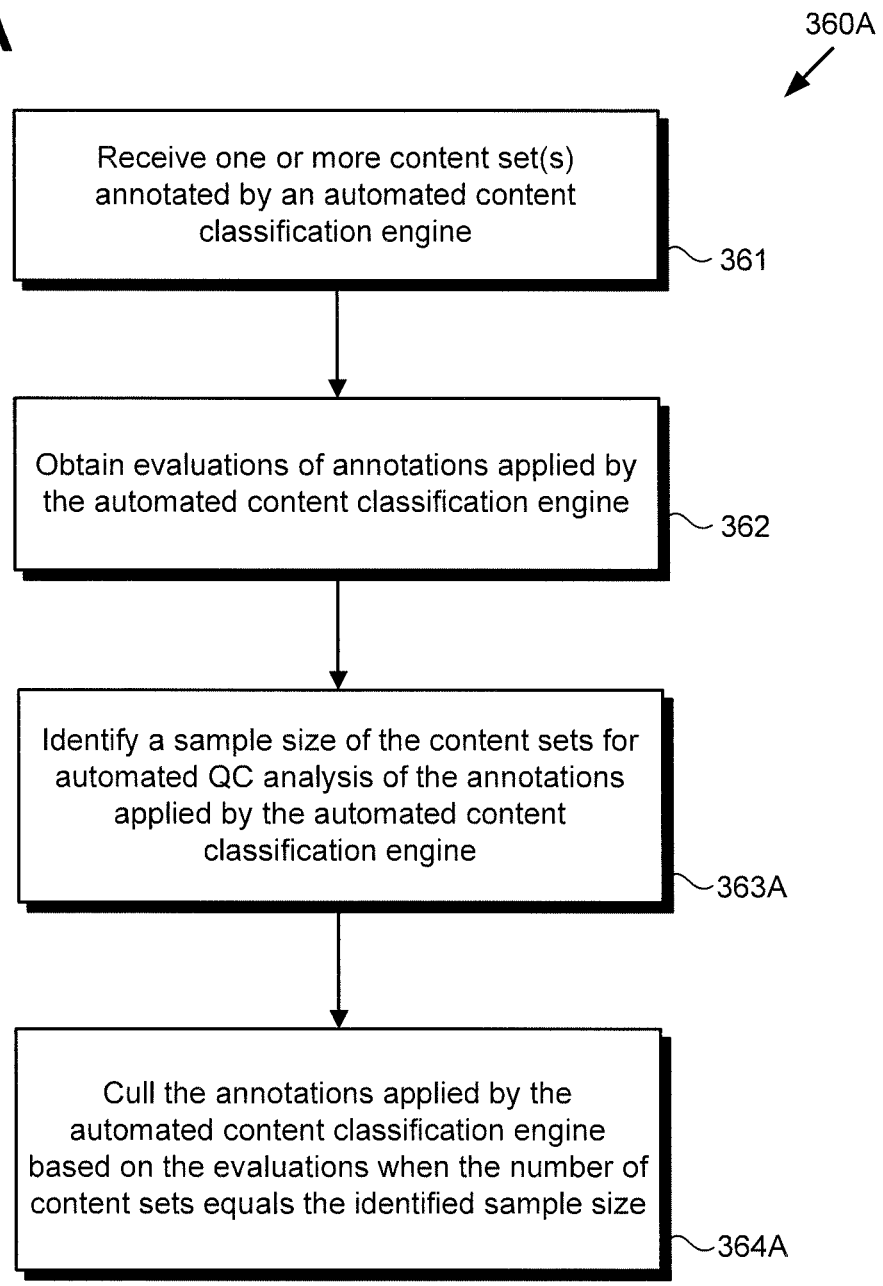

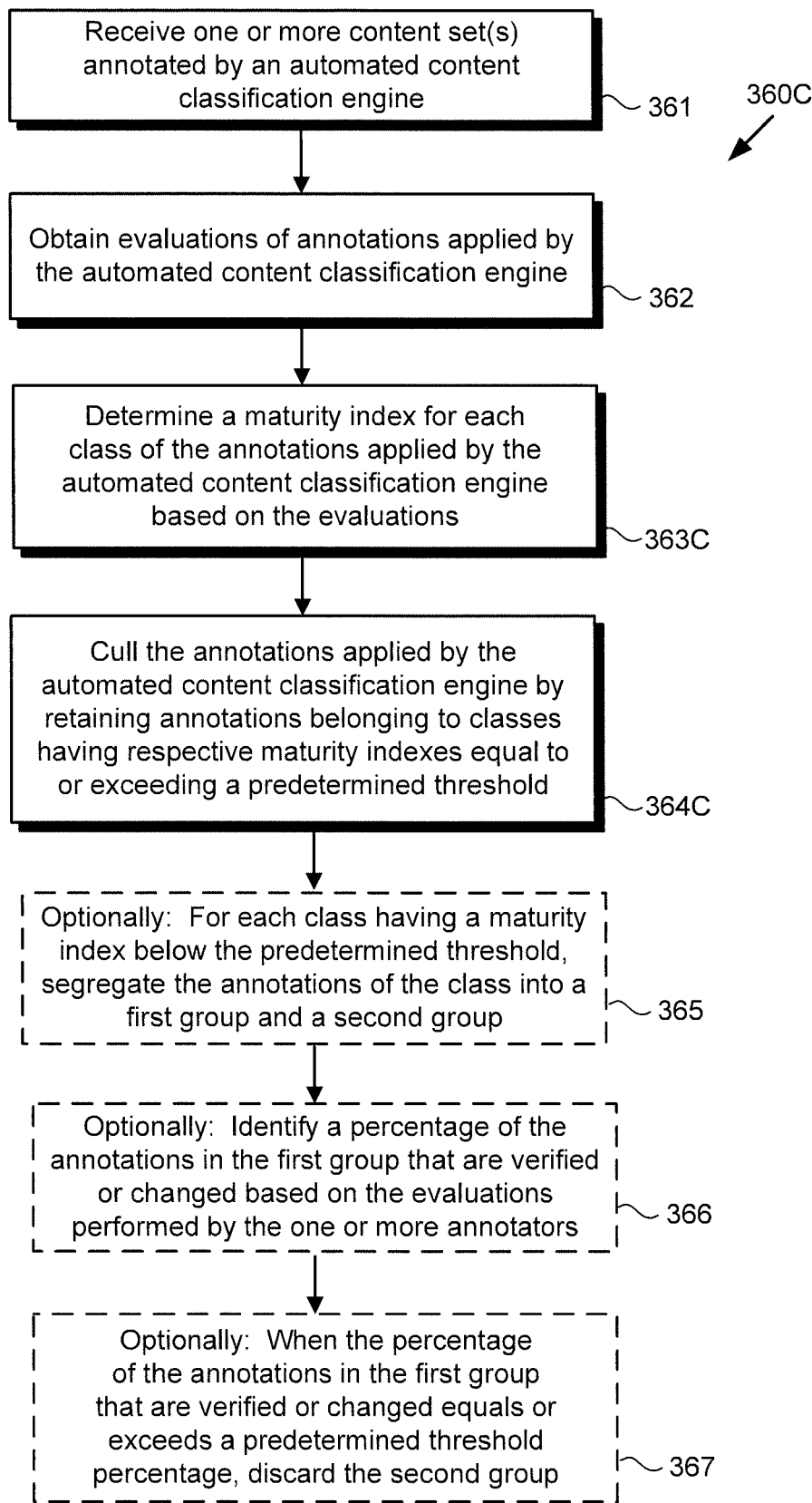

400

| Annotation Class | Verified | Rejected | Changed | Ratio | # samples |
|---|---|---|---|---|---|
| Character A | 39 | 0 | 3 | 1.0 | 281 |
| Character B | 7 | 0 | 8 | 1.0 | 93 |
| Character C | 22 | 0 | 3 | 0.9565217391304348 | 290 |
| Character D | 19 | 1 | 9 | 0.95 | 221 |
| Character E  448 | 80 | 0 | 18 | 0.9195402298850575 | 521 |
| Character F | 184 | 4 | 62 | 0.8558139534883721 | 1176 |
| Character G | 461 | 20 | 100 | 0.8246869409660107 | 3785 |
| Character H | 133 | 9 | 55 | 0.7823529411764706 | 1393 |
| Character I | 252 | 18 | 114 | 0.7368421052631579 | 1330 |
| Character J  450 | 150 | 10 | 55 | 0.7177033492822966 | 870 |
| Character K | 94 | 17 | 85 | 0.5465116279069767 | 996 |
| Character L | 176 | 24 | 218 | 0.4389027431421446 | 1842 |

Analyzing Character H Class

452a

Group 1    93%

452b

Group 2

Group 2 is discarded

QUALITY CONTROL SYSTEMS AND METHODS FOR ANNOTATED CONTENT

BACKGROUND

Due to its popularity as a content medium, ever more video is being produced and made available to users. As a result, the efficiency with which video content can be annotated and managed has become increasingly important to the producers of that video content. For example, annotation of video is an important part of the production process for television (TV) programming and movies.

Annotation of video has traditionally been performed manually by human annotators or taggers. However, in a typical video production environment, there may be such a large number of videos to be annotated that manual tagging becomes impracticable. In response, automated solutions for annotating content are being developed. While offering efficiency advantages over traditional manual tagging, automated systems are more prone to error than human taggers. Consequently, there is a need in the art for an automated solution for performing quality control (QC) of the tags applied to content by automated content annotation systems.

SUMMARY

There are provided quality control (QC) systems for annotated content and QC methods for use by those systems, substantially as shown in and/or described in connection with at least one of the figures, and as set forth more completely in the claims.

BRIEF DESCRIPTION OF THE DRAWINGS

FIG. 3A shows a flowchart presenting an exemplary method for use by a system for performing QC of annotated content, according to one implementation;

FIG. 3C shows a flowchart presenting an exemplary method for use by a system for performing QC of annotated content, according to yet another implementation.

DETAILED DESCRIPTION

Figure 1:
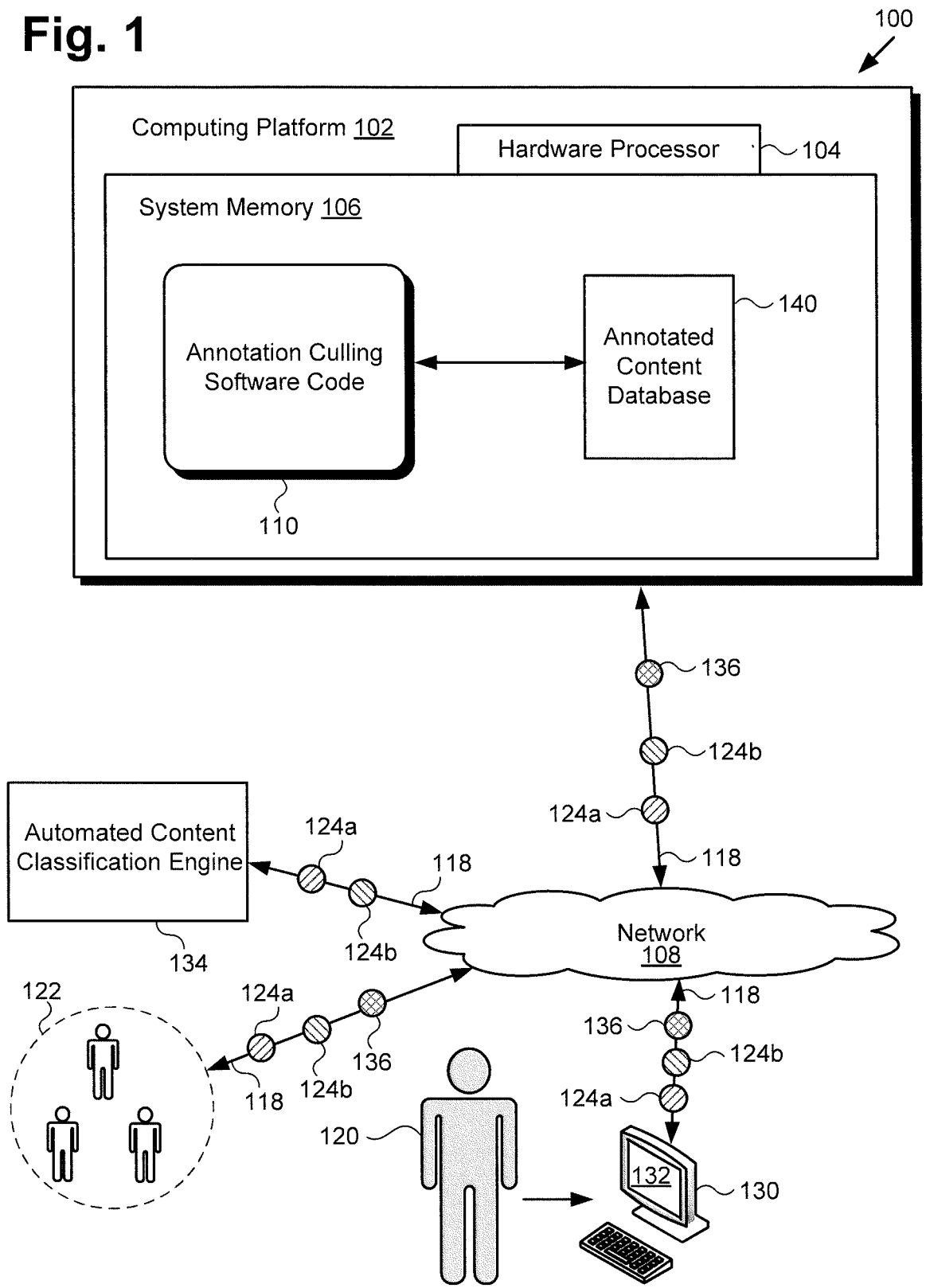
FIG. 1 shows a diagram of an exemplary quality control (QC) system for annotated content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for automating quality control (QC) of annotated content that overcome the drawbacks and deficiencies in the conventional art. It is noted that, as used in the present application, the terms "automation," "automated", and "automating" refer to systems and processes that do not require human intervention. Although, in some implementations, a human system administrator may review or even modify QC determinations for culling annotations made by the QC systems described herein, that human involvement is optional. Thus, the QC and culling of content annotations described in the present application may be performed under the control of hardware processing components executing them.

FIG. 1 shows a diagram of an exemplary QC system for annotated content, according to one implementation. QC system 100 for annotated content (hereinafter "QC system 100") includes computing platform 102 having hardware processor 104, and system memory 106 implemented as a non-transitory storage device. According to the exemplary implementation shown in FIG. 1, system memory 106 stores annotation culling software code 110 and annotated content database 140.

As shown in FIG. 1, QC system 100 may be implemented in a use environment including automated content classification engine 134 and user system 130 communicatively coupled to QC system via communication network 108 and network communication links 118. As further shown in FIG. 1, automated content classification engine 134 provides multiple content sets 124a and 124b that have been annotated by automated content classification engine 134, while human annotator 120 utilizes user system 130 to provide evaluations 136 of the annotations applied to content set 124a and/or content set 124b by automated content classification engine 134. It is noted that content sets 124a and 124b may include sets of annotated or "tagged" audio visual content, such as video content. For example, content sets 124a and 124b may include episodes of a video content series, movie content, music video content, video game content, or advertising content. It is noted that the tags applied as annotations to content sets 124a and 124b may be applied to specific timecode locations, to segments of content having start and end times, to individual frames of video, or to a region or regions within a frame of video. Also shown in FIG. 1 are optional additional human annotators 122 providing evaluations 136 of the annotations applied to content set 124a and/or content set 124b by automated content classification engine 134.

Automated content classification engine 134 may comprise code for a machine learning model. As known in the art, a "machine learning model" may refer to a mathematical model for making future predictions based on patterns learned from samples of data or "training data." Various "learning algorithms" can be used to map correlations between input data and output data (e.g., classifications). These correlations form the mathematical model that can be used to make future predictions on new input data. Exemplary implementations of automated content classification engine 134 and its operation are disclosed by U.S. Pat. No. 10,057,677, titled "Video Asset Classification", and issued on Aug. 21, 2018, which is hereby incorporated fully by reference into the present application.

By way of example, automated content classification engine 134 may be configured to use sparse annotation data, for example annotation data that is not frame precise, to create content set 124a, for instance, using unsupervised learning techniques. Once content set 124a has been created using the unsupervised data augmentation technique performed by automated content classification engine 134, the annotated content can be reviewed and evaluated by annotators, such as human annotator 120 and/or additional human annotators 122.

The process of automated content annotation and human evaluation can proceed in a virtuous circle with automated content classification engine 134 learning which of its applied annotations were mislabeled or are incomplete. The information provided by evaluations 136 can be used by the machine learning model of automated content classification engine 134 to improve the accuracy of the annotations applied to content set 124a, as well as to improve the performance of automated content classification engine 134 when annotating content set 124b. Exemplary implementations of such machine learning model improvement solutions are provided in U.S. patent application Ser. No. 15/661,084, titled "Semiautomatic Machine Learning Model Improvement and Benchmarking", and filed on Jul. 27, 2017, which is hereby incorporated fully by reference into the present application.

The present application discloses a new solution for performing QC analysis and culling of the annotations applied to content sets 124a and 124b by automated content classification engine 134, based on evaluations 136 performed by annotators, such as human annotator 120 and/or additional human annotators 122. In some implementations of QC system 100, hardware processor 104 of computing platform 102 executes annotation culling software code 110 to cull the annotations applied to content sets 124a and 124b by discarding non-validated classes of annotations applied by automated content classification engine 134 but neither verified nor changed based on evaluations 136.

According to some implementations, as described in greater detail below, hardware processor 104 executes annotation culling software code 110 to cull the annotations applied to content sets 124a and 124b by determining a maturity index for each class of annotations based on evaluations 136, and retaining annotations belonging to classes having respective maturity indexes exceeding a predetermined threshold. In those implementations, for each class of annotations determined to be immature, hardware processor 104 may further execute annotation culling software code 110 to segregate the annotations into first and second groups (e.g., shown as first group 452a and second group 452b in FIG. 4), and identify the percentage of the annotations in each group that are one of verified or changed based on evaluations 136. When the percentage of annotations that are either verified or changed based on evaluations 136 in either group exceeds a predetermined threshold percentage, the other group in the immature class may be discarded as part of the culling process.

The QC process performed by QC system 100 may be performed after several, i.e., an integer number, "N," iterations of the virtuous circle of 1) automated annotation of content set 124a and/or 124b performed by automated content classification engine 134, 2) evaluations 136 of the annotations applied to content set 124a and/or content set 124b, performed by annotators, such as human annotator 120 and/or additional human annotators 122, and 3) machine learning model improvement and benchmarking based on evaluations 136. The integer value of N sets the substantially optimal or desirable sample size, "S," for performance of the QC process by QC system 100.

In some implementations, hardware processor 104 of computing platform 102 may be configured to execute annotation content culling software code 110 to determine the QC sample size, S, of content sets 124a and 124b based in part on the content features described by the annotations applied by automated content classification engine 134. For example, the QC sample size, S, of content sets 124a and 124b may depend on whether the content features are faces, animated characters, objects, locations, or activities recognized by automated content classification engine 134. In other implementations, the QC sample size, S, of content sets 124a and 124b may be predetermined.

With respect to the representation of QC system 100 shown in FIG. 1, it is noted that although content annotation culling software code 110 and annotated content database 140 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts annotation culling software code 110 and annotated content database 140 as being mutually co-located in system memory 106, that representation is also merely provided as an aid to conceptual clarity. More generally, QC system 100 may include one or more computing platforms, such as computer servers for example, which may be co-located, or may form an interactively linked but distributed system, such as a cloud based system, for instance. As a result, hardware processor 104 and system memory 106 may correspond to distributed processor and memory resources within QC system 100. Thus, it is to be understood that annotation culling software code 110 and annotated content database 140 may be stored remotely from one another within the distributed memory resources of QC system 100.

Thus, computing platform 102 may correspond to one or more web servers, accessible over a packet-switched network such as the Internet, for example. Alternatively, computing platform 102 may correspond to one or more computer servers supporting a wide area network (WAN), a local area network (LAN), or included in another type of private or limited distribution network.

It is also noted that although user system 130 is shown as a desktop computer in FIG. 1, that representation is provided merely as an example as well. More generally, user system 130 may be any suitable mobile or stationary computing device or system that includes display 132 and implements data processing capabilities sufficient to implement the functionality ascribed to user system 130 herein. For example, in other implementations, user system 130 may take the form of a laptop computer, tablet computer, or smartphone, for example. Moreover, display 132 of user system 130 may be implemented as a liquid crystal display (LCD), a light-emitting diode (LED) display, an organic light-emitting diode (OLED) display, or any other suitable display screen that performs a physical transformation of signals to light.

Figure 2:
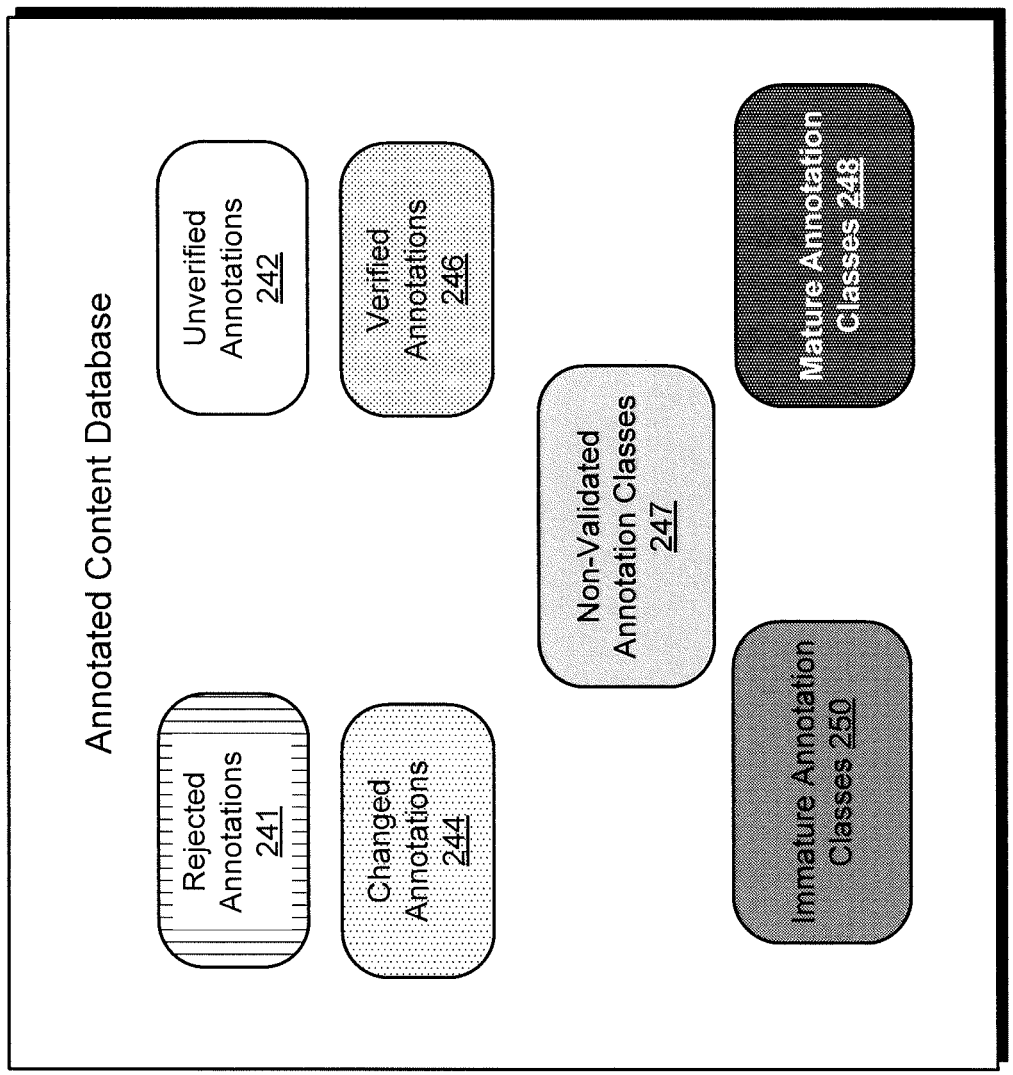
FIG. 2 shows an annotated content database including annotations applied by an automated content annotation system, according to one implementation.

FIG. 2 shows annotated content database 240 including annotations applied by automated content classification engine 134, in FIG. 1, according to one implementation. As shown in FIG. 2, annotated content database 240 includes various types of annotations including rejected annotations 241, unverified annotations 242, changed annotations 244, and verified annotations 246. In addition, annotated content database 240 includes non-validated annotation classes 247, mature annotation classes 248, and immature annotation classes 250. It is noted that, as used in the present application, "annotation class" refers to all tags or annotations applied to the same content feature, such as a particular character, e.g., Character A or Character B. Thus, an annotation class of tags applied to Character A, for example, may include some of one or more of rejected annotations 241, unverified annotations 242, changed annotations 244, and verified annotations 250.

Rejected annotations 241 are annotations originally applied to content set 124a and/or content set 124b by automated content classification engine 134 and identified as wrongly applied based on evaluations 136 performed by annotators, such as human annotator 120 and/or additional human annotators 122. Unverified annotations 242 are annotations originally applied to content set 124a and/or content set 124b by automated content classification engine 134 and neither verified nor changed by human annotator 120 and/or additional human annotators 122 performing evaluations 136. By contrast, verified annotations 246 are annotations originally applied to content set 124a and/or content set 124b by automated content classification engine 134 and confirmed as accurate by human annotator 120 and/or additional human annotators 122 performing evaluations 136.

Changed annotations 244 are annotations originally applied to content set 124a and/or content set 124b by automated content classification engine 134 that have been modified and/or supplemented, e.g., an additional tag or tags have been added, by human annotator 120 and/or additional human annotators 122 performing evaluations 136. In other words, when human annotator 120 and/or additional human annotators 122 performing evaluations 136 determines that an annotation originally applied to content set 124a and/or content set 124b by automated content classification engine 134 is incorrect, human annotator 120 and/or additional human annotators 122 can choose to simply reject the annotation (rejected annotations 241) or to change and/or supplement the annotation (changed annotations 244).

As a specific example of rejected versus changed annotations, where an annotation applied by automated content classification engine 134 to a character appearing in a frame of video misidentifies the character, evaluation 136 performed by human annotator 120 and/or additional human annotators 122 may change the annotation to correct the identification of the character. However, where an annotation applied by automated content classification engine 134 detects the presence of a character in a frame of video in which no character is present, evaluation 136 performed by human annotator 120 and/or additional human annotators 122 may reject that annotation.

Non-validated annotation classes 247 are classes of annotations applied by automated content classification engine 134 that have neither been verified nor changed based on evaluations 136 performed by human annotator 120 and/or additional human annotators 122. In other words, non-validated annotation classes 247 include only rejected annotations 241 and unverified annotations 242. By contrast, an annotation that has been validated is an annotation that has had its relation with the content feature to which it applies verified or corrected by a human (e.g., changed annotations 244 and verified annotations 250).

Mature annotation classes 248 and immature annotation classes 250 may be identified as such based on a maturity index "m" determined by annotation culling software code 110, executed by hardware processor 104. For example, the maturity index m for each annotation class may be expressed as the ratio of the annotations in that class that have been verified in evaluations 136 to a sum of the annotations in that class that have been verified, changed, and rejected based on evaluations 136. That is to say, in one implementation, for each class of annotations m may be expressed by Equation 1 as:

$$m = \frac{\text{verified annotations 242}}{\text{verified annotations 242 + changed annotations 244 + rejected annotations 241}}$$

Equation 1 will yield a fractional value from zero (0.0) to one (1.0). The threshold distinguishing mature annotation classes 248 from immature annotation classes 250 may be set based on any desired criteria. Moreover, the threshold distinguishing mature annotation classes 248 from immature annotation classes 250 may vary based on the content features described by the annotations in the annotation class, such as faces, animated characters, objects, locations, and activities, for example. In one implementation, the threshold for annotation classes based on facial recognition may be determined to be 0.8. That is to say, any annotation classes based on facial recognition and having m≥0.8 are considered to be mature, while any annotation classes based on facial recognition and having m<0.8 are considered to be immature. In some implementations, the threshold distinguishing mature annotation classes 248 from immature annotation classes 250 may be based on some average of the ages of the annotations included in the class, or the age of the annotation class itself.

Annotated content database 240 corresponds in general to annotated content database 140, in FIG. 1. Consequently, annotated content database 140 may share any of the characteristics attributed to corresponding annotated content database 240 by the present disclosure, and vice versa. Thus, although not shown in FIG. 1, annotated content database 140 may include annotations corresponding respectively to rejected annotations 241, unverified annotations 242, changed annotations 244, verified annotations 246, non-validated annotation classes 247, mature annotation classes 248, and immature annotation classes 250.

Figure 3B:
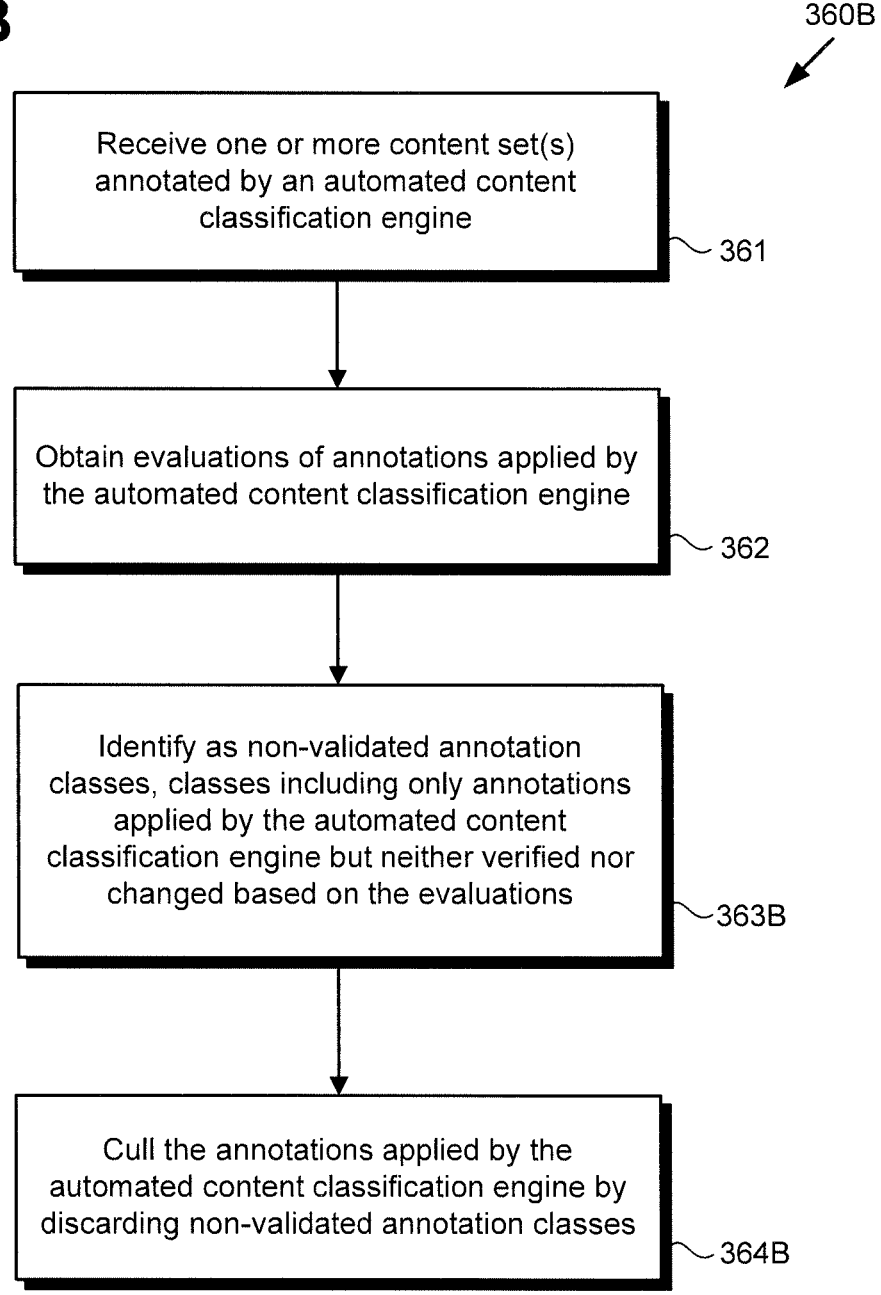
FIG. 3B shows a flowchart presenting an exemplary method for use by a system for performing QC of annotated content, according to another implementation.

The functionality of QC system 100 including annotation culling software code 110 will be further described by reference to FIGS. 3A, 3B, and 3C in combination with FIGS. 1 and 2. FIG. 3A shows flowchart 360A presenting an exemplary method for use by a system for performing QC of annotated content, according to one implementation, while FIG. 3B shows flowchart 360B presenting another implementation of such a method. FIG. 3C shows flowchart 360C presenting an exemplary method for use by a system for performing QC of annotated content, according to yet another implementation, With respect to the methods outlined in FIGS. 3A, 3B, and 3C, it is noted that certain details and features have been left out of respective flowcharts 360A, 360B, and 360C in order not to obscure the discussion of the inventive features in the present application.

Referring now to FIG. 3A in combination with FIG. 1, flowchart 360A begins with receiving content set 124a and/or content set 124b annotated by automated content classification engine 134 (action 361). Each of content sets 124a and 124b may include instantiations of any of a wide variety of content types, as well as descriptive annotations or tags associated with that content. For example, the content included in each of automatically annotated content sets 124a and 124b may include video or audio-visual content in the form of multiple episodes of video content series, multiple movies, multiple video games, multiple music videos, or multiple commercials.

As noted above, automated annotation of content sets 124a and 124b may be performed as disclosed by U.S. Pat. No. 10,057,677, titled "Video Asset Classification", issued on Aug. 21, 2018, and which is incorporated fully by reference into the present application. Automatically annotated content sets 124a and 124b may be received by annotation culling software code 110, executed by hardware processor 104 of computing platform 102.

Flowchart 360A continues with obtaining evaluations 136 of annotations applied by automated content classification engine to the received content set 124a and/or the received content set 124b, where evaluations 136 are performed by one or more of annotators, such as human annotator 120 and additional human annotators 122 (action 362). Evaluations 136 by one or more of more of human annotator 120 and additional human annotators 122 may result in the annotations applied by automated content classification engine 134 being classified in annotated content database 140/240 as rejected annotations 241, unverified annotations 242, changed annotations 244, or verified annotations 246. Evaluations 136 by one or more of more of human annotator 120 and additional human annotators 122 may be obtained by annotation culling software code 110, executed by hardware processor 104, for example via communication network 108 and network communication links 118.

The process of automated content annotation and human evaluation represented by actions 361 and 362 can proceed in a virtuous circle with automated content classification engine 134 learning which of its applied annotations were mislabeled or are incomplete. As noted above, the information provided in evaluations 136 can be used by the machine learning model of automated content classification engine 134 to improve the accuracy of the annotations applied to content set 124a, as well as to improve the performance of automated content classification engine 134 when annotating content set 124b at a later time. As further noted above, exemplary implementations of such machine learning model improvement solutions are provided in U.S. patent application Ser. No. 15/661,084 titled "Semiautomatic Machine Learning Model Improvement and Benchmarking", filed on Jul. 27, 2017, and which is also incorporated fully by reference into the present application. Flowchart 360A continues with identifying a sample size of the received content set 124a and/or the received content set 124b for QC analysis of the annotations applied by automated content classification engine 134 (action 363A). As noted above, the QC process performed by QC system 100 may occur after several, i.e., an integer number, N, iterations of the virtuous circle of 1) automated annotation of content set 124a and/or content set 124b performed by automated content classification engine 134, 2) evaluations 136 of the annotations applied to content set 124a and/or content set 124b, performed by annotators, such as human annotator 120 and/or additional human annotators 122, and 3) machine learning model improvement and benchmarking based on evaluations 136. The integer value of N sets the substantially optimal or desirable sample size S for performance of the QC process by QC system 100. For example, where each of the N virtuous circles described above involves the automated annotation of two content sets corresponding to first and second content sets 124a and 124b, the QC sample size S=2N. By contrast, where each of the N virtuous circles described above involves the automated annotation of five content sets, S=5N, and so forth.

As also noted above, in some implementations, hardware processor 104 of computing platform 102 may be configured to execute annotation content culling software code 110 to identify the QC sample size, S, of content sets 124a and 124b by determining the sample size, S, based in part on the content features described by the annotations applied by automated content classification engine 134. For example, the QC sample size, S, identified in action 363A may depend on whether the content features are faces, animated characters, objects, locations, or activities recognized by automated content classification engine. In other implementations, the QC sample size, S, identified in action 363A may be predetermined.

Flowchart 360A can conclude with culling the annotations applied by automated content classification engine 134 based on evaluations 136 performed by annotators, such as human annotator 120 and/or additional human annotators 122 when the number of annotated content sets 124a and 124b equals the sample size, S, identified in action 363A (action 364A). Culling of the annotations applied by automated content classification engine 134 may be performed by annotation culling software code 110, executed by hardware processor 104 of computing platform 102. It is noted that the culling of annotations applied by automated content classification engine 134 can be performed using one or more of the techniques discussed below by reference to flowcharts 360B and 360C. With respect to flowcharts 360B and 360C, it is further noted that actions 361 and 362 included in those exemplary process flows correspond in general to actions 361 and 362 in flowchart 360A, and will not be further described below.

Referring to action 363B in FIG. 3B, the method outlined in flowchart 360B includes identifying as non-validated annotation classes 247, classes including only annotations applied by automated content classification engine 134 that are neither verified nor changed based on evaluations 136 performed by human annotator 120 and/or additional human annotators 122. For example, referring to FIG. 2, action 363B may result in rejected annotations 241 and unverified annotations 242 being identified as non-validated annotations. Identification of rejected annotations 241 and unverified annotations 242 as non-validated annotations may be performed by annotation culling software code 110, executed by hardware processor 104.

Flowchart 360B can conclude with culling the annotations applied by automated content classification engine 134 by discarding non-validated annotation classes 247 (action 364B). For example, action 364B may include discarding non-validated annotation classes 247 that include only rejected annotations 241 and unverified annotations 242 from annotated content database 140/240. Action 364B may be performed by annotation culling software code 110, executed by hardware processor 104.

It is noted that in some implementations, actions 363B and 364B may follow substantially directly from actions 361 and 362. However, in other implementations, actions 363A may precede actions 363B and 364B, and the culling described in action 364A may be performed through execution of actions 363B and 364B. That is to say, in some implementations, before identifying non-validated annotation classes 247, hardware processor 104 may execute annotation culling software code 110 to determine or otherwise identify a sample size, S, of content sets for automated QC analysis of the annotations, and initiate culling of the annotations applied by automated content classification engine 134, by performing actions 363B and 364B, when the number of annotated content sets 124a and 124b equals the sample size S.

In addition to actions 363B and 364B, or as an alternative to those actions, culling of the annotations applied to content sets 124a and 124b by automated content classification engine 134 can be based on the actions outlined in flowchart 360C. Referring to action 363C in FIG. 3C, the method outlined in flowchart 360C includes determining maturity index, m, for each class of annotations applied by automated content classification engine 134 based on evaluations 136 performed by annotators, such as human annotator 120 and/or additional human annotators 122. Determination of the maturity index for each class of annotations applied to content sets 124a and 124b by automated content classification engine 134 may be performed by annotation culling software code 110, executed by hardware processor 104, and may result in identification of mature annotation classes 248 and immature annotation classes 250.

An annotation class is mature when it has been validated several times, thereby ensuring that its forming samples are correct. The maturity index m may be determined based on evaluations 136 as defined above by Equation 1. For example, and as noted above, mature annotation classes 248 may include only those annotation classes having m greater than or equal to 0.8, as determined using Equation 1. The value of m may be updated on each loop of the virtuous circle. Multiple loops on the virtuous circle yield an ever more accurate maturity index.

Flowchart 360C can continue with culling the annotations applied by automated content classification engine 134 by retaining annotations belonging to classes having respective maturity indexes exceeding a predetermined threshold (action 364C). For example, where mature annotation classes 248 are determined to have respective values of m equaling or exceeding the predetermined threshold, e.g., 0.8, in action 363C, action 364C may include retaining all of mature annotation classes 248 in content annotation database 140/240. Action 364C may be performed by annotation culling software code 110, executed by hardware processor 104.

Figure 4:
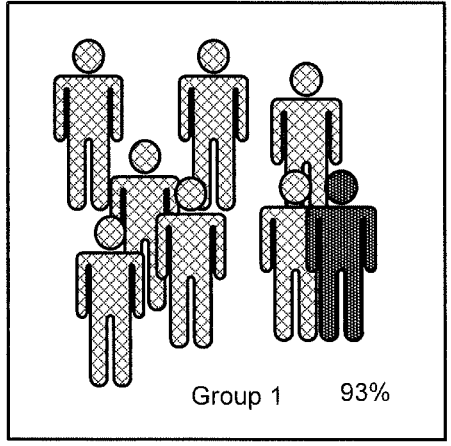
FIG. 4 shows a diagram depicting a culling process for annotation classes based on their determined maturity, according to one implementation.
Figure 4:
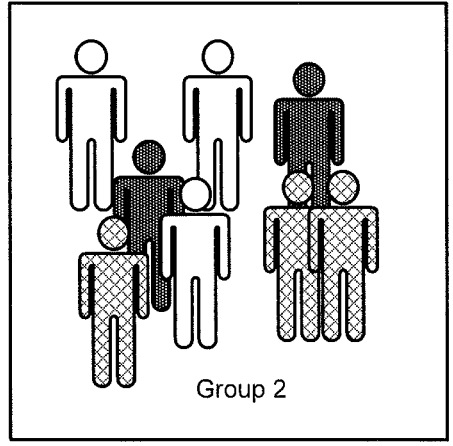

In addition, in some implementations, once the maturity index m is calculated for all annotation classes in content annotation database 140/240, further analysis of immature annotation classes 250, e.g., annotation classes with m less than 0.8, can be performed. For instance, FIG. 4 shows diagram 400 depicting a culling process for annotation classes based on their determined maturity, according to one implementation. It is noted that the culling process depicted in FIG. 4 corresponds to the method outlined by flowchart 360C, in FIG. 3C.

The annotation classes being analyzed in FIG. 4 include mature annotation classes 448 having respective m values of greater than or equal to 0.8, as well as immature annotation classes 450 having respective m values of less than 0.8, where the "Ratio" column indicates the m value of each annotation class. It is noted that mature annotation classes 448 and immature annotation classes 450 correspond respectively in general to mature annotation classes 248 and immature annotation classes 250, in FIG. 1. Thus, mature annotation classes 248 and immature annotation classes 250 may share any of the characteristics attributed to respective mature annotation classes 448 and immature annotation classes 450 by the present disclosure, and vice versa.

As noted above, action 364C results in retaining mature annotation classes 248/448 in content annotation database 140/240. In some implementations, the method outlined by flowchart 360C can conclude with action 364C. However, in other implementations, it may be advantageous or desirable to further analyze and cull immature annotation classes 250/450 through performance of optional actions 365, 366, and 367, described below, in order to provide greater dataset improvements.

With respect to immature annotation classes 250/450, flowchart 360C can optionally continue with having hardware processor 104 execute annotation culling software code 110 to segregate each immature annotation class 250/450 into a first group 452a and a second group 452b using features from the content classification model (action 365). In implementations in which content sets 124a and 124b include audio visual content, such as video for example, segregation of an immature annotation class 250/450 into first and second groups 452a and 452b may be performed by first transforming the images tagged by the annotations into numerical vectors. That transformation can be performed by means of manually engineered feature extractors, or by one or more neural networks, for instance. Similarity between two images can be interpreted as the distance between the numerical vectors representing the images. Annotations included in immature annotation class 250/450 can be segregated into first and second groups 452a and 452b based on the proximity of their representative vectors.

Hardware processor 104 can then optionally execute annotation culling software code 110 to identify a percentage of the annotations in the first group that are one of verified or changed (i.e., validated annotations) based on evaluations 136 performed by annotators, such as human annotator 120 and/or additional human annotators 122 (action 366). When the percentage of the annotations in first group 452a that are one of verified or changed based on evaluations 136 equals or exceeds a predetermined threshold percentage, flowchart 360C can optionally conclude with having hardware processor 104 execute annotation culling software code 110 to discard second group 452b (action 367).

According to the example shown by FIG. 4, a predetermined percentage of 60% is selected as the threshold percentage. It is noted that the predetermined percentage presently described, e.g., 60%, is a different threshold than the threshold m distinguishing mature annotation classes 248/448 from immature annotation classes 250/450. However, in other examples, the predetermined percentage may be a same value as the threshold m distinguishing mature annotation classes 248/448 from immature annotation classes 250/450 (e.g., the predetermined percentage may be 80%, while the threshold m may be 0.8). The annotations belonging to the immature annotation class "Character H" are segregated into first group 452a and second group 452b. It is further noted that first group 452a and second group 452b are distinct from content sets 124a and 124b, although first group 452a and/or second group 452b may include annotations applied to content set 124a and/or content set 124b by automated content classification engine 134. Because the percentage of annotations in first group 452a that have been verified or changed by human annotator 120 and/or additional human annotators 122 (93%) exceeds the threshold percentage of 60%, second group 452b of Character H annotations can be discarded from content annotation database 140/240.

It is noted that in cases in which the percentage of the annotations that are one of verified or changed based on evaluations 136 fails to equal or exceed the predetermined threshold percentage for both of first group 452a and second group 452b, neither group is discarded. In that case, both groups are retained pending future QC analysis following one or more additional iterations of the virtuous circle of 1) automated annotation of content set 124a and/or content set 124b performed by automated content classification engine 134, 2) evaluations 136 of the annotations applied to content set 124a and/or content set 124b, performed by annotators, such as human annotator 120 and/or additional human annotators 122, and 3) machine learning model improvement and benchmarking based on evaluations 136.

It is further noted that in some implementations, actions 363C and 364C may follow substantially directly from actions 361 and 362. However, in other implementations, actions 363A and 364A may precede actions 363C and 364C. That is to say, in some implementations, before determining the maturity index for each class of the annotations applied by automated content classification engine 134, hardware processor 104 may execute annotation culling software code to determine or otherwise identify a sample size, S, of content sets for automated QC analysis of the annotations, and cull the annotations applied by automated content classification engine 134 when the number of annotated content sets 124a and 124b equals the sample size S. It is also noted that while in some implementations, actions 363C and 364C may be performed in lieu of actions 363B and 363B, in other implementations, all of actions 363A, 364A, 363B, 364B, 363C, and 364C may be performed. Moreover, in any culling process flow including action 363C, optional actions 365, 366, and 367 may be performed.

Thus, the present application discloses systems and methods for automating QC of annotated content that overcome the drawback's and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A quality control (QC) system for annotated content, the QC system comprising:
    a computing platform including a hardware processor and a system memory;
    an annotation culling software code stored in the system memory;
    the hardware processor configured to execute the annotation culling software code to:
        receive a plurality of content sets annotated by an automated content classification engine;
        obtain evaluations of annotations applied by the automated content classification engine to the plurality of content sets;
        identify a sample size of the plurality of content sets for automated QC analysis of the annotations applied by the automated content classification engine;
        determine a respective maturity index for each class of the annotations applied by the automated content classification engine based on the evaluations; and
        when the plurality of annotated content sets equals the identified sample size, cull the annotations applied by the automated content classification engine based on the respective maturity index for each class of the annotations.

2. The QC system of claim 1, wherein identifying the sample size of the plurality of content sets comprises determining the sample size based in part on content features described by the annotations applied by the automated content classification engine.

3. The QC system of claim 2, wherein the content features are one of faces, animated characters, or objects recognized by the automated content classification engine.

4. The QC system of claim 2, wherein the content features are one of locations or activities recognized by the automated content classification engine.

5. The QC system of claim 1, wherein the sample size of the plurality of content sets is predetermined.

6. The QC system of claim 1, wherein the hardware processor is configured to execute the annotation culling software code to further cull the annotations applied by the automated content classification engine by discarding non-validated annotation classes that include only annotations that are neither verified nor changed based on the evaluations.

7. The QC system of claim 1, wherein the hardware processor is further configured to execute the annotation culling software code to:
    classify each class as mature or immature, wherein each class having the respective maturity index equal to or exceeding a predetermined threshold is classified as mature and each class having the respective maturity indexes less than the predetermined threshold is classified as immature;
    wherein culling the annotations includes retaining classes classified as mature.

8. The QC system of claim 1, wherein the respective maturity index for each class comprises a ratio of the annotations verified based on the evaluations to a sum of the annotations verified, changed, and rejected based on the evaluations.

9. The QC system of claim 7, wherein the hardware processor is further configured to execute the annotation culling software code to:
    segregate the annotations of each class classified as immature into a first group and a second group;
    identify a percentage of the annotations in the first group that are one of verified or changed based on the evaluations; and
    when the percentage of the annotations in the first group that are one of verified or changed based on the evaluations exceeds a predetermined threshold percentage, discard the second group.

10. A quality control (QC) system for annotated content, the QC system comprising:
    a computing platform including a hardware processor and a system memory;
    an annotation culling software code stored in the system memory;
    the hardware processor configured to execute the annotation culling software code to:

receive a plurality of content sets annotated by an automated content classification engine;
obtain evaluations of annotations applied by the automated content classification engine to the plurality of content sets;
determine a sample size of the plurality of content sets for automated QC analysis of the annotations based in part on content features described by the annotations applied by the automated content classification engine;
after determining the sample size, identify as non-validated annotation classes, classes of annotations applied by the automated content classification engine that are neither verified nor changed based on the evaluations; and
cull the annotations applied by the automated content classification engine by discarding the non-validated annotation classes.

11. A quality control (QC) system for annotated content, the QC system comprising:
a computing platform including a hardware processor and a system memory;
an annotation culling software code stored in the system memory;
the hardware processor configured to execute the annotation culling software code to:
receive a plurality of content sets annotated by an automated content classification engine;
obtain evaluations of annotations applied by the automated content classification engine to the plurality of content sets;
identify a predetermined sample size of the plurality of content sets for automated QC analysis of the annotations;
after identifying the predetermined sample size, identify as non-validated annotation classes, classes of annotations applied by the automated content classification engine that are neither verified nor changed based on the evaluations; and
cull the annotations applied by the automated content classification engine by discarding the non-validated annotation classes.

12. The QC system of claim 10, wherein the hardware processor is further configured to execute the annotation culling software code to:
determine a respective maturity index for each class of the annotations applied by the automated content classification engine based on the evaluations;
classify each class as mature or immature, wherein each class having the respective maturity index equal to or exceeding a predetermined threshold is classified as mature and each class having the respective maturity indexes less than the predetermined threshold is classified as immature; and
further cull the annotations applied by the automated content classification engine by retaining annotations belonging to mature classes.

13. The QC system of claim 10, wherein the respective maturity index for each class comprises a ratio of the annotations verified based on the evaluations to a sum of the annotations verified, changed, and rejected based on the evaluations.

14. The QC system of claim 12, wherein the hardware processor is further configured to execute the annotation culling software code to:
segregate the annotations of each class classified as immature into a first group and a second group;
identify a percentage of the annotations in the first group that are one of verified or changed based on the evaluations; and
when the percentage of the annotations in the first group that are one of verified or changed based on the evaluations exceeds a predetermined threshold percentage, discard the second group.

15. A quality control (QC) system for annotated content, the QC system comprising:
a computing platform including a hardware processor and a system memory;
an annotation culling software code stored in the system memory;
the hardware processor configured to execute the annotation culling software code to:
receive a plurality of content sets annotated by an automated content classification engine;
obtain evaluations of annotations applied by the automated content classification engine to the plurality of content sets;
determine a respective maturity index for each class of the annotations applied by the automated content classification engine based on the evaluations;
classify each class as mature or immature, wherein each class having the respective maturity index equal to or exceeding a predetermined threshold is classified as mature classes and each class having the respective maturity index less than the predetermined threshold is classified as immature; and
cull the annotations applied by the automated content classification engine by retaining annotations belonging to classes classified as mature.

16. The QC system of claim 15, wherein the hardware processor is further configured to execute the annotation culling software code to:
before determining the respective maturity index for each class of the annotations applied by the automated content classification engine, determine a sample size of the plurality of content sets for automated QC analysis of the annotations based in part on content features described by the annotations applied by the automated content classification engine; and
further cull the annotations applied by the automated content classification engine when the plurality of annotated content sets equals the determined sample size.

17. The QC system of claim 15, wherein the hardware processor is further configured to execute the annotation culling software code to:
before determining the respective maturity index for each class of the annotations applied by the automated content classification engine, identify a predetermined sample size of the plurality of content sets for automated QC analysis of the annotations; and
further cull the annotations applied by the automated content classification engine when the plurality of annotated content sets equals the predetermined sample size.

18. The QC system of claim 15, wherein the respective maturity index for each class comprises a ratio of the annotations verified based on the evaluations to a sum of the annotations verified, changed, and rejected based on the evaluations.

19. The QC system of claim 15, wherein the hardware processor is further configured to execute the annotation culling software code to:

segregate the annotations of each class classified as immature into a first group and a second group;

identify a percentage of the annotations in the first group that are one of verified or changed based on the evaluations performed by at least one annotator; and when the percentage of the annotations in the first group that are one of verified or changed based on the evaluations performed by the at least one annotator exceeds a predetermined threshold percentage, discard the second group.

20. The QC system of claim 1, wherein the evaluations are performed by at least one human annotator.

* * * * *